United States Patent

Ganiaris

[11] 4,052,794
[45] Oct. 11, 1977

[54] FLUIDIZED BED PROCESS

[75] Inventor: Neophytos Ganiaris, Riverdale, N.Y.

[73] Assignee: Struthers Scientific and International Corporation, New York, N.Y.

[21] Appl. No.: 660,945

[22] Filed: Feb. 24, 1976

[30] Foreign Application Priority Data
June 18, 1971 United Kingdom ............... 28754/71

Related U.S. Application Data

[63] Continuation-in-part of Ser. No. 260,150, June 6, 1972, abandoned.

[51] Int. Cl.² .............................................. F26B 3/08

[52] U.S. Cl. ............................................. 34/10; 34/12; 159/4 CC

[58] Field of Search ............... 34/10, 11, 12; 159/4 A, 159/4 CC, 4 VM

[56] References Cited
U.S. PATENT DOCUMENTS 3,309,262  3/1967  Copeland et al. ............ 159/4 VMS
3,635,790  1/1972  Heath ........................... 159/DIG. 3

Primary Examiner—John J. Camby
Attorney, Agent, or Firm—William A. Drucker

[57] ABSTRACT

In a fluidized bed dryer or reactor in which particles are coated or aggregated to form granules, all fines separated from the exhaust gas are recycled into feed or into the fluidized bed in solution.

2 Claims, 1 Drawing Figure

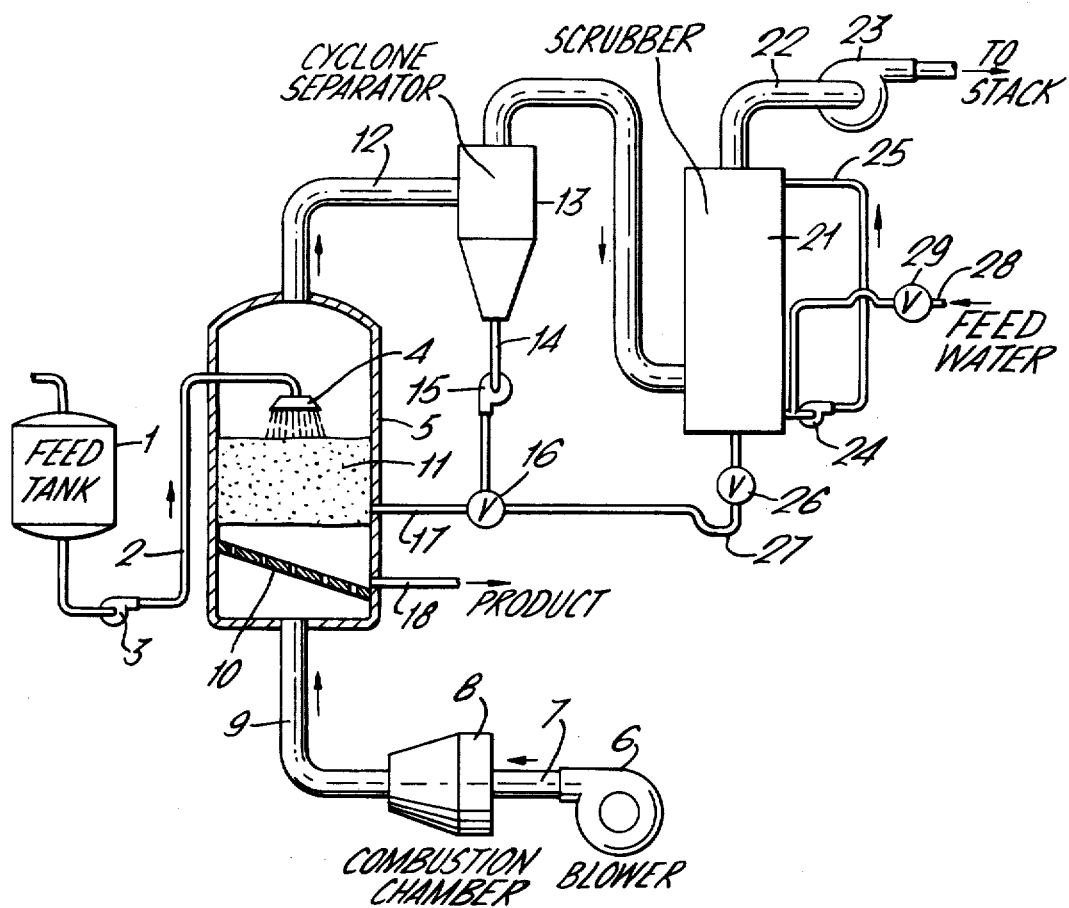

FLUIDIZED BED PROCESS

This is a continuation-in-part application of my prior application, Ser. No. 260,150, filed June 6, 1972, now abandoned.

BACKGROUND OF THE INVENTION

In a fluidized-bed granulation zone, there are two processes taking place simultaneously: (1) nucleation and (2) growth. Therefore, there is a particle size distribution in the fluidization zone. At a certain operating hot air (or gas) velocity, there is a percentage of small particles ("dust") which is carried out of the bed because the terminal velocity of these particles is lower than the operating velocity of the hot air.

The fine particles or "dust", which are airborn, are separated from the air or gases with a cyclone; most of the fines (over 90%) are separated with the cyclone and the remaining (less than 10%) are captured in the scrubber.

If the fine particles from the cyclone are returned to the fluidization zone as dried solid distinct particles as in Copeland U.S. Pat. No. 3,309,262, some will grow to a sufficient size so that they will remain within the bed. However, a large percentage will simply become airborn as soon as they are introduced to the fluidization zone. Thus, a percentage of fine particles or dust is going around and around; the net result is that larger cyclones are required in order to accommodate this unnecessary circulation of fine particles.

Whereas in the present invention, the quantity of fine particles or "dust" is limited to whatever is generated within the fluidization zone. There is an economy in equipment and a more efficient process.

Another difficulty with the recycling of dried fine particles as described by Copeland is that uniform distribution of the fine particles within the fluidization zone is almost impossible. Distribution is a major problem with large commercial equipment. For example, if the fluidized-bed chamber is 10–15 ft. in diameter, it is impossible to ensure that the recycled dried particles will be distributed uniformly in the fluidization zone. If the dried fine particles are introduced to the fluidization zone with one or two screw feeders on the periphery of the fluidized-bed-chamber as shown by Copeland, most of the particles do not get a chance to grow; they just become airborn as soon as fed to the fluidization zone and end up again in the cyclone. This problem or distribution ("Channeling") is a major one in commercial size equipment and imposes a limit to the maximum diameter of the fluidized-bed chamber.

Whereas by dissolving all the fine particles in the feed solution, the present invention will avoid completely the distribution of "Channeling" problem.

Another problem with the recycling of the fine particles as dried solids is the formation of lumps in the screw feeder or other mechanical devices. The fine particles leaving the cyclone are in the form of dust and as they go from the cyclone to the fluidized-bed, the temperature drops a few degrees. However, because the air is saturated with the solvent (water), condensation takes place. The very small quantity of condensed water and the pressure of the screw feeder cause the "dust" particles to form large lumps. These lumps (up to a few inches in size) can not be fluidized immediately as soon as they are fed to the fluidization zone. The action of the fluidized particles is not sufficient to break them up. Therefore, the lumps fall down on the grid.

Since the grid is usually very hot (500°–600° F), the material may melt or decompose. The fluidization zone temperature could be only 150°–250° F. If we keep the grid temperature low (below the point of melting or decomposition) then the quantity of air or hot gases must be increased and, in turn, the size of the equipment.

In work with ammonium sulfate which decomposes below 300° F. it has been found that lump formation, as described above, must be avoided under all circumstances in order to have a feasible continuous process.

The prior art has not recognized the above problems and for this reason indicates recycling of most fine particles as dried solids. Whereas, according to the present invention it is found that in order to eliminate the above problems, all the fine particles ("dust") should be dissolved in the feed solution and then fed to the fluidization zone.

BRIEF DESCRIPTION OF THE DRAWING

The FIGURE is a schematic diagram of apparatus used in the practice of this invention with the fluidized bed dryer or reactor shown in vertical section.

DESCRIPTION OF THE PREFERRED EMBODIMENT

Feed from tank 1 is pumped through line 2 by pumps 3 to spray from a suitable nozzle 4 into the fluidized bed dryer 5. Blower 6 passes air through duct 7 to combustion chamber 8 where any suitable fuel may be burned to heat the air. Hot air passes through duct 9 to enter the bottom of dryer 5.

In dryer 5, hot air passes upward through a perforated plate 10 or the like to form a fluidized bed 11 from material sprayed into dryer 5 from nozzle 4.

Within bed 11 water may evaporate from feed which will aggregate to form solid particles. Feed is usually about 50 percent solids content. These particles will grow as additional feed solution coats them and dries or given particles stick together while drying. As particles aggregate to form granules, these granules become too heavy to remain fluidized and fall downward to be removed as a product through pipe 18.

Small particles or fines are carried off with air leaving through duct 12 which leads to cyclone separator 13. In separator 13 fines are separated which are returned to dryer 5 through pipe 14, pump 15, valve 16 and pipe 17 along with feed water from the line 27.

Air with some gaseous and solid material leaves cyclone separator 13 through duct 20 to scrubber 21 from which it exhausts through duct 22 and blower 23. Washwater is recirculated in scrubber 21 by pump 24 through pipe 25. Dust laden water from scrubber 21 is recirculated through valve 26, pipe 27 and valve 16 to fluidized bed 11. Additional water for scrubber 21 is added as required through pipe 28 and valve 29. Thus fines not removed by cyclone separator 13 and recycled are caught in scrubber 21 and then recycled directly into the fluidized bed 11.

This invention may be used to more efficiently provide aggregated dried particles of ammonium sulphate, ferrous sulphate, or ammonium phosphate.

I claim:

1. The process of providing product granules of a desired size in a fluidized bed dryer from an aqueous feed solution comprising the steps of:

a. passing heated air upward in a fluidized bed dryer;
b. spraying an aqueous solution of feed into the dryer forming a fluidized bed therein in which drying particles aggregate and grow into granules to fall from the fluidized bed;
c. withdrawing aggregated particles from the fluidized bed as a product;
d. recovering fines blown upward from the fluidized bed;
e. passing the fines through a water scrubber with a predominently recycled water supply to provide dust in a water solution; and
f. withdrawing dust laden water from the scrubber and adding it to the fluidized bed.

2. The process of claim 1 further including the steps of passing recovered fines to a cyclone separator prior to the water scrubber and returning fines recovered in said cyclone separator and adding said fines to the dust laden water.

* * * * *